United States Patent
Kanazawa

(10) Patent No.: US 9,203,120 B2
(45) Date of Patent: Dec. 1, 2015

(54) CONTROL APPARATUS FOR VEHICLE

(75) Inventor: Hiroyuki Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 457 days.

(21) Appl. No.: 13/696,976

(22) PCT Filed: Apr. 25, 2011

(86) PCT No.: PCT/JP2011/060069
§ 371 (c)(1),
(2), (4) Date: Nov. 8, 2012

(87) PCT Pub. No.: WO2011/152157
PCT Pub. Date: Dec. 8, 2011

(65) Prior Publication Data
US 2013/0069425 A1    Mar. 21, 2013

(30) Foreign Application Priority Data
Jun. 4, 2010 (JP) ................................. 2010-129370

(51) Int. Cl.
*H01M 10/44* (2006.01)
*B60L 11/18* (2006.01)
(Continued)

(52) U.S. Cl.
CPC ........... *H01M 10/44* (2013.01); *B60L 11/1816* (2013.01); *H01M 10/48* (2013.01);
(Continued)

(58) Field of Classification Search
CPC ..... H02J 7/00; H02J 5/045; H02J 2007/0096; H01J 7/0036; Y02T 10/7005; Y02T 90/121; Y02T 90/14; Y02T 10/7088

USPC .......................................................... 307/9.1
See application file for complete search history.

(56) References Cited

U.S. PATENT DOCUMENTS

2010/0079105 A1    4/2010  Iwanaga et al.
2010/0228413 A1    9/2010  Fujitake

FOREIGN PATENT DOCUMENTS

EP        0 630 078 A2    12/1994
JP        10-309041 A     11/1998
(Continued)

OTHER PUBLICATIONS

European Search Report dated Jun. 26, 2014, for corresponding European Application No. 11789566.4.
Japanese Office Action application No. JP2012-518296 dated Aug. 12, 2014.

*Primary Examiner* — Rexford Barnie
*Assistant Examiner* — Toan Vu
(74) *Attorney, Agent, or Firm* — Squire Patton Boggs (US) LLP

(57) ABSTRACT

A control apparatus for a vehicle, wherein a detection signal, indicating the connection state of an external power feeding device 100 to an external charging connection unit 5 of a vehicle 1, is supplied from a connection state detection signal generating unit 11 to a storage device management control unit 10 and a power converter control unit 8. When detection signal indicating that an operation to release a lock mechanism 108, which locks the external power feeding device 100 connected to the external charging connection unit 5, has been performed is received from the connection state detection signal generating unit 11, the power converter control unit 8 controls a power converter 7, which feeds power from the external power feeding device 100 to an electric storage device 3, to a power feeding shutoff operation mode, independently of a charging control command received from the storage apparatus management control unit 10.

2 Claims, 8 Drawing Sheets

(51) Int. Cl.
*H01M 10/48* (2006.01)
*H02J 7/00* (2006.01)
*H02J 7/04* (2006.01)

(52) U.S. Cl.
CPC ............... *H02J 7/00* (2013.01); *H02J 7/0036* (2013.01); *H02J 7/045* (2013.01); *B60L 2230/12* (2013.01); *H02J 2007/0096* (2013.01); *Y02T 10/7005* (2013.01); *Y02T 10/7088* (2013.01); *Y02T 90/121* (2013.01); *Y02T 90/14* (2013.01)

(56) References Cited

FOREIGN PATENT DOCUMENTS

| JP | 2007-236172 | * | 9/2007 |
| JP | 2007-236172 | A | 9/2007 |
| JP | 2009-77535 | A | 4/2009 |
| WO | 2010/047207 | A1 | 4/2010 |
| WO | 2010/060370 | A1 | 6/2010 |

* cited by examiner

CONTROL APPARATUS FOR VEHICLE

CROSS REFERENCE TO RELATED APPLICATION

This application is a National Stage entry of International Application PCT/JP2011/060069, filed Apr. 25, 2011, which claims priority to Japanese Patent Application No. 2010-129370, filed Jun. 4, 2010, the disclosure of the prior applications are hereby incorporated in their entirety by reference.

TECHNICAL FIELD

The present invention relates to a control apparatus for a vehicle related to the charging of an electric storage device.

BACKGROUND ART

As a vehicle provided with an electric motor serving as a propulsion generating source and an electric storage device, such as a battery, for storing the power supply energy of the electric motor, there has been known a vehicle disclosed in, for example, Patent Document 1. This vehicle is provided with a connection unit for connecting thereto an external power feeding device, which uses a home AC power supply or the like as an original power supply so as to allow the electric storage device to be charged from the external power feeding device connected to the connection unit.

As described in the aforesaid Patent Document 1, in this type of vehicle, when an external power feeding device is connected to a connection unit of the vehicle, a control unit of the vehicle (a control unit that controls the charging of an electric storage device) is started in response thereto. Then, the control unit controls a charger between the connection unit of the vehicle and the electric storage device to cause the external power feeding device to charge the electric storage device.

Herein, the external power feeding device may be disconnected from the connection unit of the vehicle by a user even while the electric storage device is in the middle of being charged. If the external power feeding device is removed from the connection unit of the vehicle in the middle of the charging of the electric storage device as described above, i.e., in a state wherein electricity is being supplied from the external power feeding device to the electric storage device, then an arc tends to occur at the connection unit. This in turn tends to cause deterioration of an energizing terminal of the connection unit of the vehicle or an energizing terminal of the connection unit of the external power feeding device. This leads to a likelihood of an increase in the contact resistances of the energizing terminals, generating heat at the connection units at the time of subsequent charging of the electric storage device thereafter.

Hence, according to the art disclosed in the aforesaid Patent Document 1, a detection signal related to the state of the connection of the external power feeding device to the connection unit of the vehicle is supplied to the control unit. Hence, if the detection signal received while the electric storage device is being charged is a signal indicating that an operation for disconnecting the external power feeding device has been carried out, then the control unit controls the charger to stop charging the electric storage device.

PRIOR ART DOCUMENT

Patent Document

Patent Document 1: Japanese Patent Application Laid-Open No. 2009-77535

SUMMARY OF THE INVENTION

Problem to be Solved by the Invention

According to the art disclosed in Patent Document 1, the control unit is adapted not only to control the charger according to the detection signal but also calculates the remaining capacity (SOC) of the electric storage device on the basis of detection signals of a voltage sensor and a current sensor thereby to control the charger. Hence, the load of the arithmetic processing of the control unit tends to become relatively high. This places a restriction in achieving higher arithmetic processing speed (arithmetic processing cycle) of the control unit.

In addition, normally, an arithmetic processing unit, which directly controls switch elements and the like of a circuit constituting the charger, and an arithmetic processing unit, which calculates the remaining capacity of the electric storage device and carries out control processing for determining whether the electric storage device should be charged, are constructed of separate microcomputers or the like. In this case, therefore, the processing for the communication between the arithmetic processing units is required. Further, the communication processing is likely to cause a delay in controlling the operation of the charger. For example, even if a cause for which the operation of the charger should be stopped occurs, there will be a delay by the time required for the aforesaid communication processing from the instant the cause occurs until the operation of the charger is actually stopped.

Meanwhile, the speed at which a user disconnects an external power feeding device from a connection unit of a vehicle varies from one user to another. Thus, depending on the proficiency or the like of a user, the external power feeding device may be removed very promptly. In such a case, there will be a delay attributable to the arithmetic processing by the control unit and the aforesaid communication processing from the time when the external power feeding device is removed to the time when the operation of the charger is actually stopped (the time when the charger cuts off the supply of electricity to the electric storage device from the external power feeding device). As a result, a situation in which the removal of the external power feeding device is completed by the time the operation of the charger is stopped frequently happens.

Thus, the art disclosed in Patent Document 1 has been posing an inconvenience in that a case, where the supply of electricity from an external power feeding device to an electric storage device cannot be stopped before the external power feeding device is removed from a connection unit of a vehicle, tends to occur.

The present invention has been made with a view of the aforesaid background, and it is an object of the invention to provide a control apparatus for a vehicle which is capable of stopping, with higher reliability, the supply of electricity from an external power feeding device to an electric storage device before the external power feeding device is removed from a connection unit of a vehicle.

Means for Solving the Problem

To this end, a control apparatus for a vehicle in accordance with the present invention includes: an electric storage device; an external charging connection unit to which an external power feeding device, which supplies electric power for charging the electric storage device from outside a vehicle, can be detachably connected and the external power feeding device is locked thereto through the intermediary of a lock mechanism in a state in which the external power feeding device is in connection thereto; and a power converter which is electrically connected to the external charging connection unit and the electric storage device and which is capable of controlling an operation mode to a power feeding operation mode for converting power supplied from the external power feeding device to the external charging connection unit into power to be charged in the electric storage device and then feeding the converted power to the electric storage device, and a power feeding shutoff operation mode, which is an operation mode for cutting off the power feeding, the control apparatus for vehicle comprising:

a connection state detection signal generating unit which generates at least a detection signal indicating a case where the external power feeding device has been connected to the external charging connection unit and a detection signal indicating a case where the lock mechanism has been released to disconnect the external power feeding device from the external charging connection unit;

an electric storage device management control unit which receives the detection signals from the connection state detection signal generating unit and generates and outputs a charge control command instructing whether or not to charge the electric storage device while monitoring a charge/discharge state of the electric storage device; and a power converter control unit which receives the detection signals from the connection state detection signal generating unit and also receives the charge control command from the electric storage device management control unit to control the operation mode of the power converter according to the detection signals or the charge control command, wherein the power converter control unit controls the power converter to the power feeding operation mode in the case where the charge control command instructing that the electric storage device should be charged is input from the electric storage device management control unit and also controls the power converter to the power feeding shutoff operation mode independently of the charge control command in the case where the detection signal, which indicates that the lock mechanism has been released, is input from the connection state detection signal generating unit.

According to the present invention described above, the detection signal generated by the connection state detection signal generating unit is supplied also to the power converter control unit, which directly controls the power converter, in addition to the electric storage device management control unit. Further, if the detection signal received from the connection state detection signal generating unit is the detection signal indicating that the lock mechanism has been released to disconnect the external power feeding device from the external charging connection unit, i.e., if a user is trying to disconnect the external power feeding device from the external charging connection unit, then the power converter control unit controls the power converter to the power feeding shutoff operation mode independently of a charge control command generated by the electric storage device management control unit.

In this case, the power converter control unit immediately controls the power converter to the power feeding shutoff operation mode in response to the aforesaid detection signal without waiting for the input of the charge control command from the electric storage device management control unit.

Hence, if an attempt is made to disengage the external power feeding device from the external charging connection unit, then the power converter can be controlled to the power feeding shutoff operation mode before the charge control command indicating that the charging of the electric storage device from the electric storage device management control unit should be stopped is supplied to the power converter control unit. This makes it possible to cut off the flow of current from the external power feeding device to the electric storage device before the disconnection of the external power feeding device from the external charging connection unit is completed.

Thus, according to the present invention, the supply of power to the electric storage device from the external power feeding device can be stopped with higher reliability before the external power feeding device is removed from the connection unit of the vehicle. This consequently makes it possible to effectively prevent an arc from being generated at a place where the external power feeding device and the vehicle are connected.

In the present invention, the power converter control unit is preferably a control unit that controls the operation mode of the power converter at an arithmetic processing cycle that is faster than that of the electric storage device management control unit.

Thus, the power converter control unit will recognize the detection signal and caries out control of the power converter according to the detection signal at the fast arithmetic processing cycle. Hence, when the user tries to disengage the external power feeding device from the external charging connection unit, the response speed of the processing by the power converter control unit to stop the supply of power from the external power feeding device to the electric storage device can be significantly increased. As a result, the reliability for stopping the supply of power from the external power feeding device to the electric storage device before the external power feeding device is removed from the connection unit of the vehicle can be further enhanced.

Further, according to the present invention, the connection state detection signal generating unit is constructed, for example, as described below.

The connection state detection signal generating unit includes: a first resistor on a vehicle, which is connected between a pair of terminals provided on the external charging connection unit; a second resistor on the vehicle, which is connected in series with the first resistor on the vehicle; and an external resistance circuit provided in the external power feeding device such that the external resistance circuit is connected in parallel to the first resistor on the vehicle between the pair of terminals in a state in which the external power feeding device is in connection with the external charging connection unit, wherein the external resistance circuit is configured such that the resistance value thereof differs between a case where an operation for releasing the lock mechanism has been performed and a case where the operation for releasing the lock mechanism has not been performed, and outputs a potential signal, which is generated at one end of the second resistor on the vehicle adjacent to the first resistor on the vehicle, as the detection signal by applying a DC voltage to a circuit, which is comprised of the first resistor on the vehicle, the second resistor on the vehicle and the external resistance circuit, in a state in which the external power feeding device is in connection with the external charging connection unit.

Thus, the external resistance circuit is configured such that the resistance value thereof differs between a case where an operation for releasing the lock mechanism has been performed and a case where the releasing operation has not been performed. Hence, if the DC voltage is applied to the circuit comprised of the first resistor on the vehicle, the second resistor on the vehicle and the external resistance circuit in a state in which the external power feeding device is in connection with the external charging connection unit, then the voltage value of a potential signal generated at one end of the second resistor on the vehicle that is adjacent to the first resistor on the vehicle will differ between the case where the operation for releasing the lock mechanism has been performed and the case where the releasing operation has not been performed.

In addition, the voltage value of the potential signal will differ between the state in which the external power feeding device is in connection with the external charging connection unit and the state in which the external power feeding device has been disconnected.

Therefore, the potential signal can be used as a detection signal that indicates the case where the operation for releasing the lock mechanism has been performed and the case where the releasing operation has not been performed in the state wherein the external power feeding device is in connection with the external charging connection unit. Further, the potential signal makes it possible to identify whether the external power feeding device is in connection with the external charging connection unit.

Further, configuring the connection state detection signal generating unit as described above allows the connection state detection signal generating unit to have a simple, inexpensive configuration.

The aforesaid external resistance circuit can be configured by, for example, interconnecting a plurality of resistors and a switch element that turns on/off according to whether the lock mechanism has been released or not.

MODE FOR CARRYING OUT THE INVENTION

Figure 1:
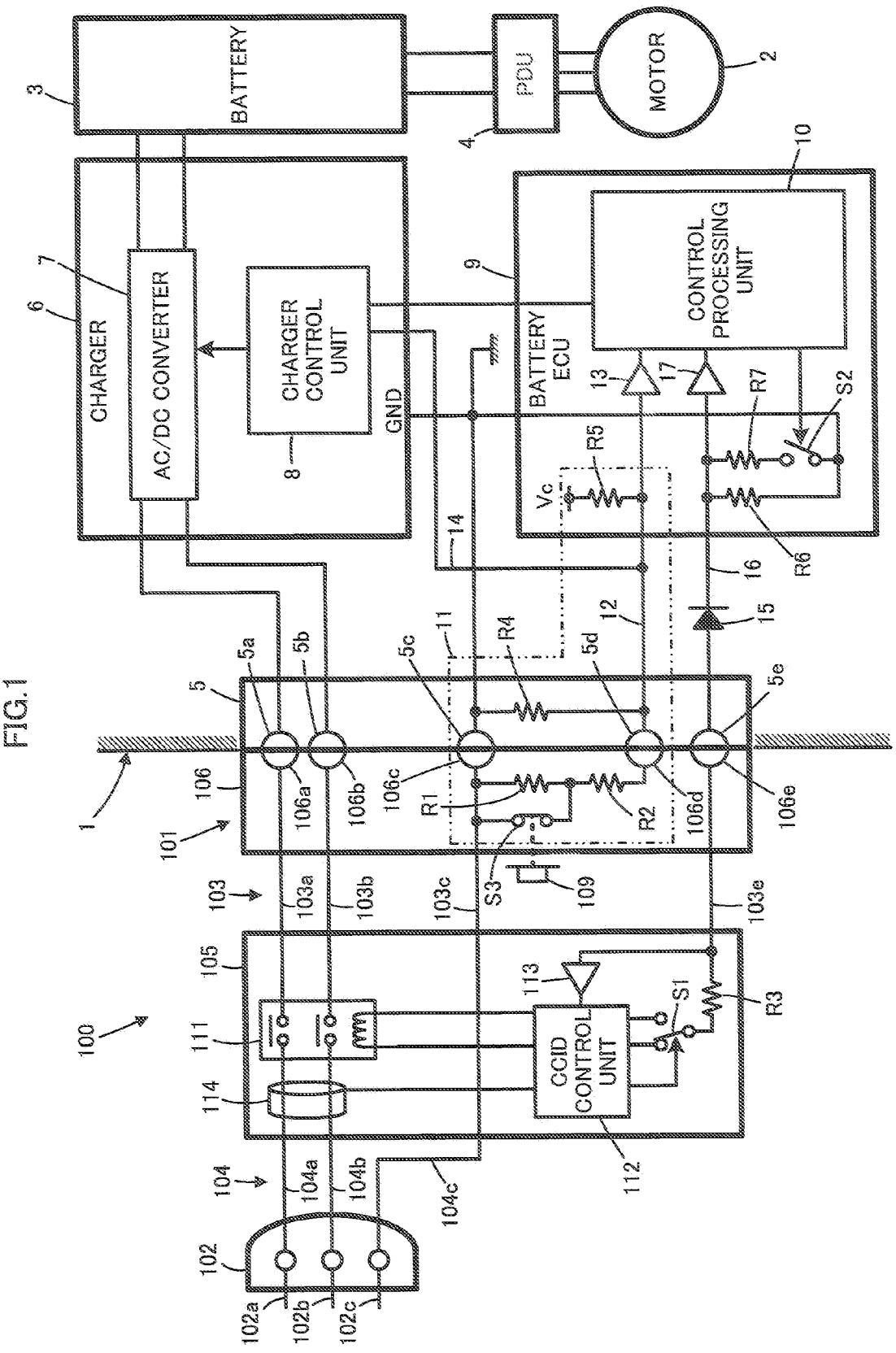
[FIG. 1] It is a diagram illustrating the circuit configuration of a vehicle and an external power feeding device according to an embodiment of the present invention.

An embodiment of the present invention will be described below. Referring to FIG. 1, a vehicle 1 in the present embodiment is a vehicle provided with an electric motor 2 as a propulsion generating source. The vehicle 1 may be a hybrid vehicle provided with a different propulsion generating source other than the electric motor 2, e.g., an engine.

The vehicle 1 has a battery (secondary cell) 3 serving as an electric storage device that stores the power supply energy of the electric motor 2. The electric motor 2 is connected to the battery 3 through the intermediary of a power drive unit 4 (hereinafter referred to as the PDU 4), which is a drive circuit that includes an inverter circuit and the like. Electric power can be transferred between the electric motor 2 and the battery 3 through the PDU 4. The electric storage device may be constituted of, for example, a capacitor.

The vehicle 1 is provided with an external charging connection unit 5, which is a part for connecting an external power feeding device 100, which supplies the electric power for charging the battery 3 from outside the vehicle 1.

The configuration of the external power feeding device 100 will now be described. The external power feeding device 100 is constituted of a connector assembly 101, which is detachably installed to an external charging connection unit 5 of the vehicle 1, a plug 102 connected to an electric outlet (not shown) of an AC power supply in a house or the like, and a CCID (Charging Circuit Interrupt Device) 105 located between and connected to the connector assembly 101 and the plug 102 through cables 103 and 104, respectively.

Figure 2:
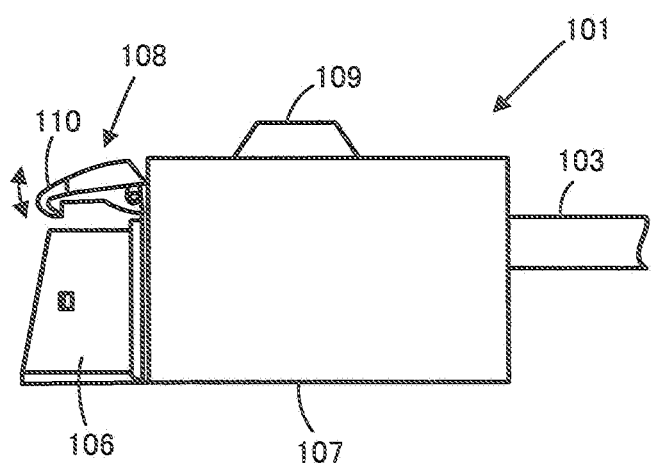
[FIG. 2] It is a diagram illustrating the appearance configuration of a connector assembly 101 of an external power feeding device 100 illustrated in FIG. 1.

The connector assembly 101 has an outer shape shown in FIG. 2. The connector assembly 101 has a handle section 107 having an external connection section 106, which can be removably connected to (inserted in and removed from) the external charging connection unit 5 of the vehicle 1, at the distal end thereof, a lock mechanism 108 for locking the connector assembly 101 onto the vehicle 1 in the state in which the external connection section 106 is in connection with the external charging connection unit 5, and a manual operation button 109 for operating the lock mechanism 108.

The lock mechanism 108 has a swingable locking hook 110 arranged besides the external connection section 106 at the distal end of the handle section 107. The lock mechanism 108 is adapted to lock the connector assembly 101 onto the vehicle 1 to prevent the external connection section 106 from coming off from the external charging connection unit 5 by hooking the locking hook 110 onto a hooked section (not shown) of the external charging connection unit 5 to which the external connection section 106 has been connected.

In this case, the locking hook 110 of the lock mechanism 108 is adapted to swing when the manual operation button 109 provided on the handle section 107 is pressed or when the pushed state thereof is cleared. More specifically, the locking hook 110 swings to an unlock position at which the locking of the connector assembly 101 to the vehicle 1 is released when the manual operation button 109 is pressed. In this state, the external connection section 106 of the connector assembly 101 can be attached to or detached from (inserted in or removed from) the external charging connection unit 5 of the vehicle 1.

Further, when the pressed state of the manual operation button 109 is cleared, the locking hook 110 swings and resets itself by the urging force of a spring (not shown) to the lock position at which the connector assembly 101 is locked onto the vehicle 1.

As illustrated in FIG. 1, the external connection section 106 of the connector assembly 101 has five connection terminals, namely, a pair of AC terminals 106a and 106b, a grounding terminal 106c, and two signal terminals 106d and 106e. The AC terminals 106a and 106b are a pair of terminals for supplying AC power to the vehicle 1. Further, the AC terminals 106a and 106b are connected to a pair of AC power supply input terminals 102a and 102b of the plug 102 through the intermediary of a pair of live wires 103a and 103b included in a cable 103, a relay switch 111 provided in the CCID 105, and a pair of live wires 104a and 104b included in the cable 104.

The relay switch 111 is controlled to be turned on/off by a CCID control unit 112 (to be discussed later) built in the CCID 105.

The grounding terminal 106c is connected to a grounding terminal 102c of the plug 102 through a live wire 103c included in the cable 103 and a live wire 104c included in the cable 104. The live wire 103c of the cable 103 and the live wire 104c of the cable 104 are in conduction by internal wiring of the CCID 105.

A signal terminal 106d is a terminal for constituting a connection state detection signal generating unit 11, which generates a detection signal indicating the connection of the connector assembly 101 to the vehicle 1 by the connection with a circuit of the vehicle 1, which will be discussed hereinafter. In this case, the connector assembly 101 includes, as the constituent elements of the connection state detection signal generating unit 11, a pair of resistors R1 and R2 connected in series between a signal terminal 106d and a grounding terminal 106c, and a switch (micro switch) S3 which opens or closes as the manual operation button 109 is pressed or released. The switch S3 is connected in parallel to the resistor R1. Hence, the resistance value between the signal terminal 106d and the grounding terminal 106c is greater in the case where the switch S3 opens as the manual operation button 109 is pressed than in the case the switch S3 closes as the manual operation button 109 is released from the pushed state.

In the present embodiment, the resistors R1 and R2 and the switch S3 implement the external resistance circuit in the present invention.

The signal terminal 106e is a signal terminal for carrying out communication between the CCID 105 and a control processing unit 10 of a battery ECU 9 of the vehicle 1, which will be discussed hereinafter. In this case, the CCID 105 includes a CCID control unit 112 which carries out mainly the control of opening/closing the relay switch 111. The signal terminal 106e is connected to the CCID control unit 112 through the intermediary of a live wire 103e included in the cable 103, a resistor R3 included in the CCID 105, and a selector switch S1. Further, the CCID control unit 112 is capable of outputting a communication signal (hereinafter referred to the "CPL signal") for communicating information, such as the permissible charging current of the external power feeding device 100, to the connection terminal 106e through the intermediary of the selector switch S1 and the resistor R3. In this case, the CPL signal output by the CCID control unit 112 through the selector switch S1 (the CPL signal supplied to the resistor R3) is a constant-voltage signal (e.g., a voltage signal of 12 [V]) or a PWM signal (pulse-width modulated signal).

Further, one end of the resistor R3 (one end on the opposite side from the selector switch S1) is connected to the CCID control unit 112 through a buffer 113. An output of the buffer 113 enables the CCID control unit to recognize the potential level of the signal terminal 106e.

The CCID 105 includes a zero-phase current transformer (ZCT) 114 serving as a leakage detector for detecting the leakage of the AC power supplied to the vehicle 1. The CCID control unit 112 monitors for electrical leakage on the basis of an output of the zero-phase current transformer (ZCT) 114.

The above has described the configuration of the external power feeding device 100.

The external charging connection unit 5 of the vehicle 1 is provided with five connecting terminals, namely, AC terminals 5a and 5b, a grounding terminal 5c, and signal terminals 5d and 5e, which are in conduction with the AC terminals 106a and 106b, the grounding terminal 106c, and the signal terminals 106d and 106e, respectively, of the external connection section 106 of the external power feeding device 100. The external charging connection unit 5 is further provided with a resistor R4, which is connected between the signal terminal 5d and the grounding terminal 5c, as a constituent element of the connection state detection signal generating unit 11. The resistor R4 has a sufficiently larger resistance value than those of the resistors R1 and R2 of the connector assembly 101. For example, the resistor R4 has a resistance value of the order of a few k$\Omega$, while the resistors R1 and R2 have resistance values of the order of a few hundred $\Omega$. Further, the grounding terminal 5c is grounded to the body or the like of the vehicle 1.

The resistor R4 corresponds to the first resistor of the vehicle in the present invention.

The vehicle 1 further has, in addition to the external charging connection unit 5, a charger 6, which includes an AC/DC converter 7 connected to the AC terminals 5a and 5b and the battery 3 to supply power to the battery 3 through the AC terminals 5a and 5b of the external charging connection unit 5 from the external power feeding device 100, and the battery ECU 9, which is an electronic circuit unit that manages the charge/discharge state of the battery 3.

The AC/DC converter 7 of the charger 6 is a power converter that converts the AC power, which is supplied from the external power feeding device 100 to the AC terminals 5a and 5b of the external charging connection unit 5, into the DC power to be charged in the battery 3 and supplies the DC power to the battery 3. The circuit configuration is a publicly known one, which is constituted of a rectifying bridge circuit, a power factor improvement circuit (PFC), a DC/DC converter and the like, which are not shown.

The AC/DC converter 7 is capable of selectively controlling the operation mode of the AC/DC converter 7 between a power feeding operation mode, which is an operation mode for converting the AC power into the DC power and then supplying the DC power to the battery 3, and a power feeding shutoff operation mode, which is an operation mode for cutting off the power feeding, by controlling the turning on/off of switch elements included in the DC/DC converter and the power factor improvement circuit. In this case, the charger 6 is provided with a charger control unit 8 constituted of a microcomputer. The charger control unit 8 controls the turning on/off of the switch element of the AC/DC converter 7, thereby controlling the operation mode of the AC/DC converter 7. The charger control unit 8 corresponds to the power converter control unit in the present invention.

The battery ECU 9 is provided with the control processing unit 10 constituted of a microcomputer. The control processing unit 10 has a function for monitoring the charge/discharge state (more specifically, the remaining capacity) of the battery 3 and generates and outputs a charge control command instructing whether to charge the battery 3. The charge control command is output from the control processing unit 10 to the charger control unit 8 of the charger 6 through the signal line 10a. The charge control command is a serial signal. The control processing unit 10 corresponds to the electric storage device management control unit in the present invention.

The battery ECU 9 is provided with a resistor R5 as a constituent element of the connection state detection signal generating unit 11, one end of the resistor R5 being connected to the signal terminal 5d through a signal line 12. A constant voltage Vc (e.g., 5V) is applied to the other end of the resistor R5 when the battery ECU 9 is actuated. The resistance value of the resistor R5 is set to a resistance value that is approximately the same as the resistance values of the resistors R1 and R2 (e.g., resistance values of a few hundred Ω) of the connector assembly 101. The resistor R5 corresponds to the second resistor of the vehicle in the present invention.

In the present embodiment, the connection state detection signal generating unit 11 is constituted of the resistor R5, the resistors R1, R2 and the switch S3 of the connector assembly 101, and the resistor R4 of the external charging connection unit 5. The connection state detection signal generating unit 11 generates a potential of the signal terminal 5d (=a potential of the signal line 12) as a detection signal indicating the connection of the connector assembly 101 to the vehicle 1 (hereinafter referred to as the connector connection detection signal).

In this case, the voltage level of the connector connection detection signal (the potential of the signal terminal 5d) generated by the connection state detection signal generating unit 11 is a voltage level V1, which has substantially the same magnitude as the constant voltage Vc applied to the resistor R5, in a non-connection state in which the external connection section 106 of the connector assembly 101 is not in connection with the external charging connection unit 5 of the vehicle 1.

Further, the voltage level of the connector connection detection signal will be a voltage level V2 (<V1) obtained by dividing the constant voltage Vc by the resultant resistance of the resistors R1 and R2 and the resistor R5 in a state in which the external connection section 106 of the connector assembly 101 is in connection with the external charging connection unit 5 of the vehicle 1 and the manual operation button 109 of the connector assembly 101 has been pressed (in a state in which the switch S3 is open).

Further, the voltage level of the connector connection detection signal will be a voltage level V3 (<V2) obtained by dividing the constant voltage by the resistor R2 and the resistor R5 in a state in which the external connection section 106 of the connector assembly 101 is in connection with the external charging connection unit 5 of the vehicle 1 and the pressed state of the manual operation button 109 of the connector assembly 101 has been released (in a state in which the switch S3 is closed).

Thus, the connector connection detection signals generated by the connection state detection signal generating unit 11 will be signals of mutually different voltage levels V1, V2 and V3 (V1>V2>V3) in the non-connection state, in which the external connection section 106 is not in connection with the external charging connection unit 5, the state in which the external connection section 106 is in connection with the external charging connection unit 5 and the manual operation button 109 of the connector assembly 101 has been pressed, and the state in which the external connection section 106 is in connection with the external charging connection unit 5 of the vehicle 1 and the manual operation button 109 of the connector assembly 101 has been released from the pressed state, respectively. The different voltage levels make it possible to identify the state of connection of the connector assembly 101 to the vehicle 1.

Further, the connector connection detection signals are input from the signal terminal 5d to the control processing unit 10 of the battery ECU 9 through the signal line 12 and a buffer 13.

Further, in the present embodiment, the connector connection detection signals are input also to the charger control unit 8 through a signal line 14 branched from the signal line 12. Then, the charger control unit 8 controls the operation mode of the AC/DC converter 7 according to the connector connection detection signals received from the connection state detection signal generating unit 11 and the charging control command received from the control processing unit 10 of the battery ECU 9.

In this case, to be more specific, the charger control unit 8 switches the operation mode of the AC/DC converter 7 from the power feeding shutoff operation mode to the power feeding operation mode in the case where the charging control command indicating that battery 3 should be charged is received from the control processing unit 10 of the battery ECU 9 when the AC/DC converter 7 is in the power feeding shutoff operation mode.

Further, when the AC/DC converter 7 is in the power feeding operation mode, if the charging control command indicating that the charging of the battery 3 should be stopped is received from the control processing unit 10 of the battery ECU 9 or if the voltage level of the connector connection detection signal received from the connection state detection signal generating unit 11 has changed from the aforesaid V3 to V2 (i.e., if the manual operation button 109 of the connector assembly 101 is pressed in the state in which the external connection section 106 is in connection with the external charging connection unit 5 of the vehicle 1), then the charger control unit 8 switches the operation mode of the AC/DC converter 7 from the power feeding operation mode to the power feeding shutoff operation mode.

Further, the battery ECU 9 is provided with resistors R6 and R7 and a switch element S2, which is controlled to be turned on/off by the control processing unit 10, as the constituent elements for carrying out communication with the CCID control unit 112 of the CCID 105. In this case, the resistor R7 and the switch element S2 are connected in series. Further, the resistor R6 is connected in parallel to all the resistor R7 and the switch element S2.

Further, the portion in which the resistor R6 and the switch element S2 are connected is grounded in the vehicle 1, and the portion in which the resistor R6 and the resistor R7 are connected is connected to the signal terminal 5e of the external charging connection unit 5 through a signal line 16 with a diode 15 interposed therebetween. In addition, the potential of the portion in which the resistor R6 and the resistor R7 are connected (an output voltage at the cathode end of the diode 15) is supplied from the signal line 16 to the control processing unit 10 through the intermediary of a buffer 17 as a signal of communication with the CCID control unit 112.

In this case, if the control processing unit 10 controls the switch element S3 to be off in the state wherein the external connection section 106 is in connection with the external charging connection unit 5, then a voltage signal of a level, which is obtained by dividing the CPL signal output from the CCID control unit 112 through the intermediary of the selector switch S1 (more specifically; a partial signal on the positive polarity side of the CPL signal) by the resistor R3 of the CCID 105 and the resistor R6 of the battery ECU 9, is supplied to the control processing unit 10 as a signal indicating the communication information of the CPL signal.

Further, if the control processing unit 10 controls the switch element S3 to be on in the state wherein the external connection section 106 is in connection with the external charging connection unit 5, then a voltage signal of a level, which is obtained by dividing the CPL signal output from the CCID control unit 112 through the intermediary of the selector switch S1 (more specifically, a partial signal on the positive polarity side of the CPL signal) by the resistor R3 of the CCID 105 and the parallel resultant resistance of the resistors R6 and R7 of the battery ECU 9, is supplied to the control processing unit 10 as the communication signal.

Although not shown, the control processing unit 10 of the battery ECU 9 receives the detection data on an output voltage and an energizing current of the battery 3 from sensors, which are not shown, in addition to the detection signals and the communication signals described above. The control processing unit 10 has a function for carrying out arithmetic processing for calculating the remaining capacity (SOC) of the battery 3 by a publicly known technique on the basis of the detection data.

A description will now be given of the operation for charging the battery 3 of the vehicle 1 according to the present embodiment.

First, the operation at the start of charging the battery 3 will be described with reference to FIG. 3 and FIG. 4.

Figure 3:
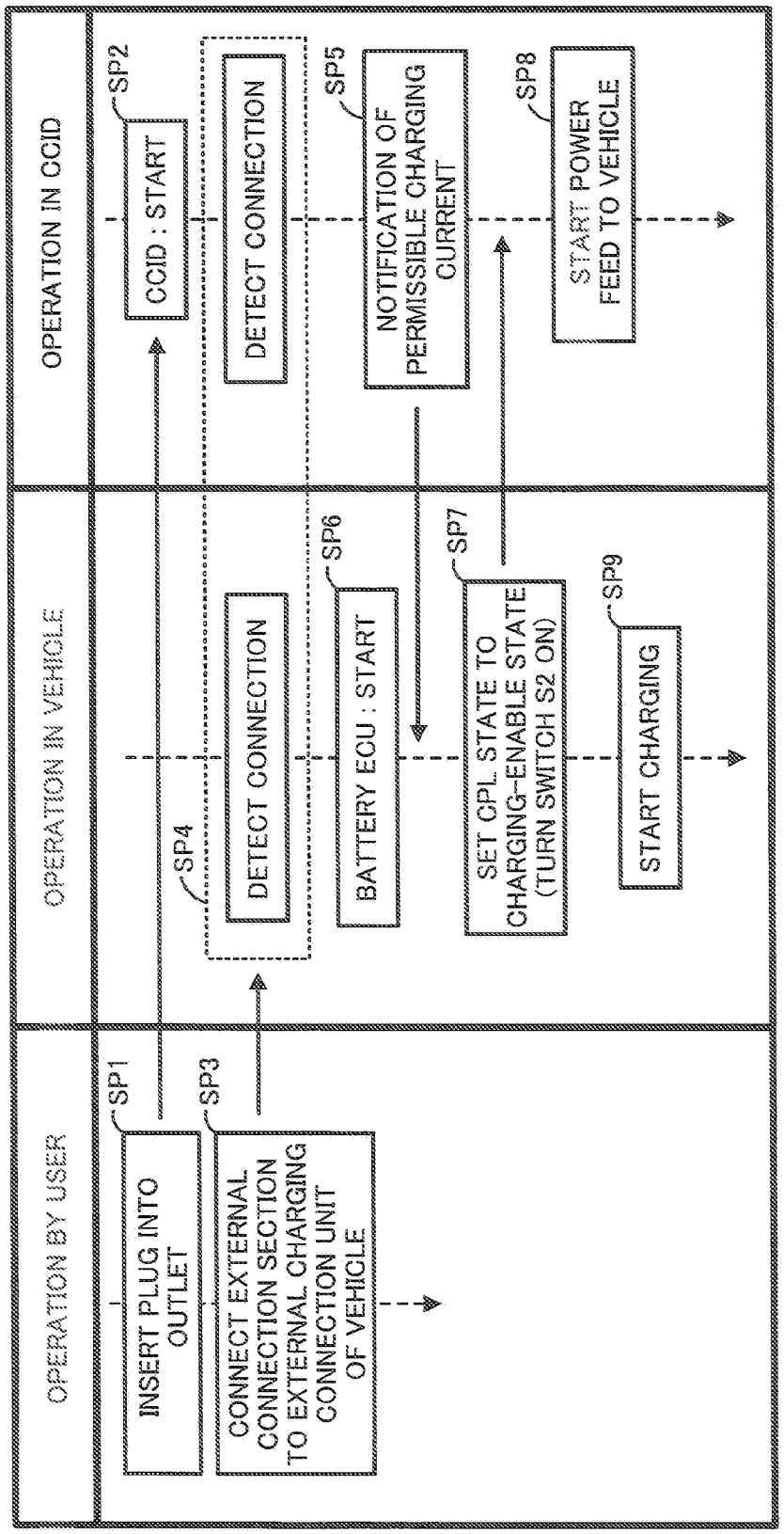
[FIG. 3] It is a diagram illustrating the operation at the time of a start of charging a battery 3 provided in a vehicle 1 illustrated in FIG. 1.

Referring to FIG. 3, in the case where the battery 3 of the vehicle 1 is charged by using the external power feeding device 100, a user first connects the plug 102 of the external power feeding device 100 to an electric outlet (not shown) of an AC power supply (SP1). This actuates the CCID 105 of the external power feeding device 100 (SP2).

Subsequently, the user connects the external connection section 106 of the connector assembly 101 to the external charging connection unit 5 of the vehicle 1 (SP3). In this case, more specifically, the user connects the external connection section 106 to the external charging connection unit 5 of the vehicle 1 in the state wherein the manual operation button 109 of the connector assembly 101 has been pressed (the locking hook 110 of the lock mechanism 108 has been swung to the unlocking position and the switch S3 has been opened). Then, after the connection, the user locks the connector assembly 101 onto the vehicle 1 and closes the switch S3.

Figure 4:
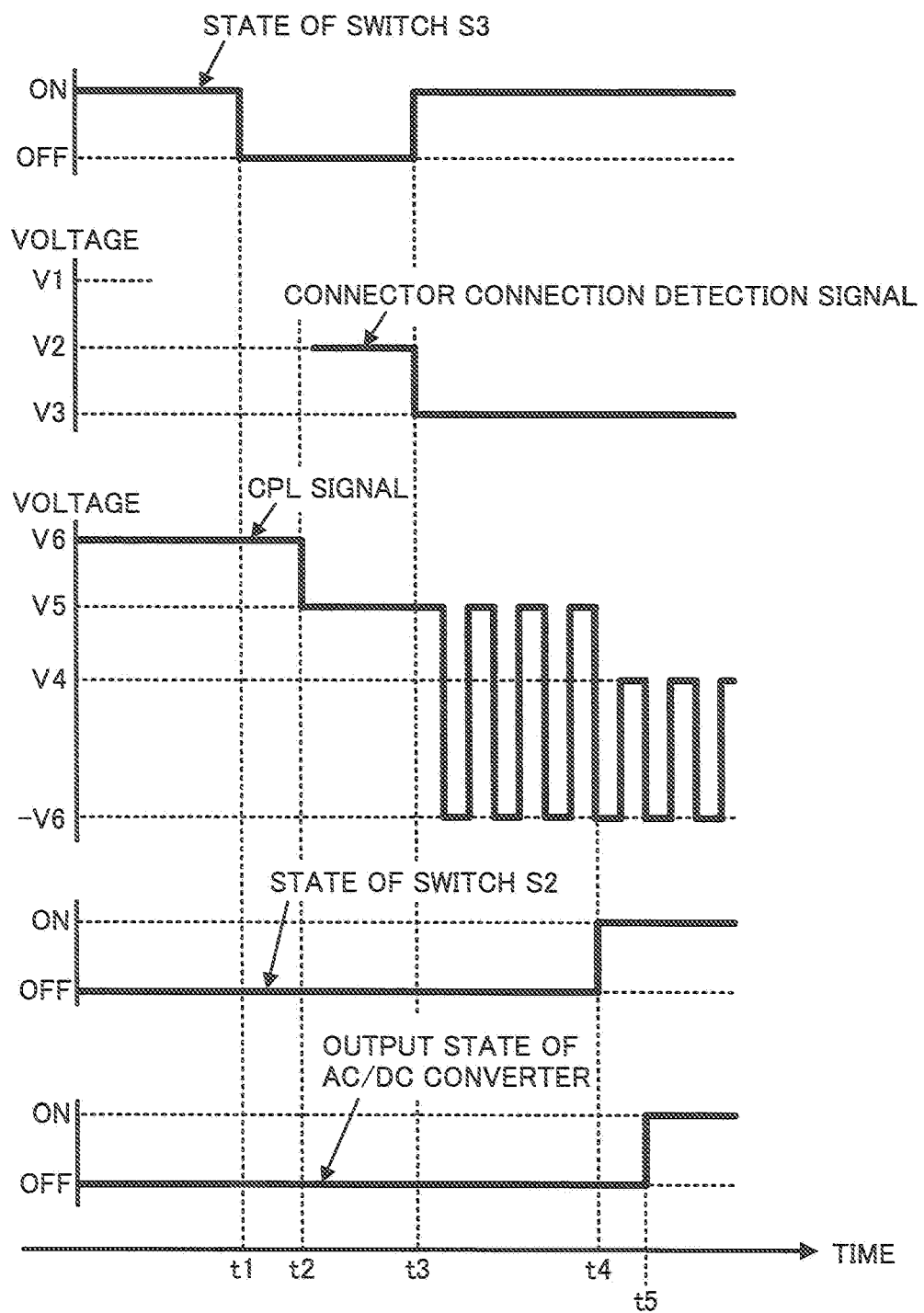
[FIG. 4] It is a timing chart illustrating the operation at the time of a start of charging the battery 3 provided in the vehicle 1 illustrated in FIG. 1.

In FIG. 4, time t1 denotes the time at which the user pressed the manual operation button 109 to open (turn off) the switch S3 before connecting the external connection section 106 to the external charging connection unit 5 of the vehicle 1, time t2 denotes the time at which the battery ECU 9 was actuated when the external connection section 106 was connected to the external charging connection unit 5, and time t3 denotes the time at which, after the connection, the user released the manual operation button 109 from the pressed state thereby to close (turn on) the switch S3.

In this case, according to the present embodiment, the constant voltage Vc is applied to one end of the resistor R5 of the connection state detection signal generating unit 11, and the voltage level of the connector connection detection signal input to the control processing unit 10 of the battery ECU 9 from the connection state detection signal generating unit 11 will be V2 immediately after time t2 at which the battery ECU 9 is started up. Before time t2, the constant voltage Vc is not applied to one end of the resistor R5, so that the voltage level of the connector connection detection signal is zero. Then, at time t3 at which the pressed state of the manual operation button 109 is cleared to close the switch S3, the voltage level of the connector connection detection signal changes from V2 to V3.

The CPL signal (the voltage signal applied to a signal terminal 16*e*) output by the CCID control unit 112 of the CCID 105 started up in the aforesaid SP2 to the signal terminal 106*e* through the intermediary of the selector switch S1 and the resistor R3 changes, for example, as illustrated in FIG. 4. The CCID 105 outputs a constant-voltage signal of a fixed voltage level V6 (e.g., 12[V]) to the resistor R3 through the selector switch S1 in an initial period immediately following the startup thereof.

In this case, the external connection section 106 is not connected to the external charging connection unit 5 until time t2, so that the CPL signal output to the signal terminal 16*e* will be the aforesaid constant-voltage signal of the V6 voltage level. Then, from time t2, the voltage of the CPL signal is divided by the resistor R3 of the CCID 105 and the resistor R6 of the battery ECU 9 (at this stage, the switch S2 is off), thereby causing the CPL signal output to the signal terminal 16*e* to change into a constant-voltage signal of a fixed voltage level V5, which is lower than the aforesaid V6.

Returning to FIG. 3, when the external connection section 106 is connected to the external charging connection unit 5 (at time t2 in FIG. 4) as described above, this is detected by the vehicle 1 and also detected by the CCID 105 of the external power feeding device 100 (SP4 in FIG. 3).

More specifically, in the vehicle 1, as illustrated in FIG. 4, the connection of the external connection section 106 to the external charging connection unit 5 is detected by the input of the CPL signal of the voltage level V5 from the CCID 105 to the control processing unit 10 of the battery ECU 9 through the intermediary of the signal terminals 106*e* and 5*e*, the diode 15, and the buffer 17.

Further, the CCID control unit 112 detects the connection of the external connection section 106 to the external charging connection unit 5 when the voltage level of the CPL signal output from the CCID control unit 112 to the signal terminal 106*e* changes from V6 to V5 and the voltage level of the CPL signal is supplied to the CCID control unit 112 through the buffer 113.

Then, the CCID 105 of the external power feeding device 100 that has detected the connection of the external connection section 106 to the external charging connection unit 5 supplies information, such as the permissible charge current of the external power feeding device 100, to the vehicle 1 (SP5 in FIG. 3). To be more specific, the CCID control unit 112 of the CCID 105 generates a PWM signal (a square-wave pulse CPL signal shown in FIG. 4) indicating the information, such as the permissible charge current, and outputs the generated PWM signal as the CPL signal to the signal terminal 106*e* through the intermediary of the selector switch S1 and the resistor R3.

In this case, the PWM signal output by the CCID control unit 112 through the selector switch S1 (the PWM signal supplied to the resistor R3) is a square-wave pulse signal having +V6 and −V6 as the wave height value on the positive side and the wave height value on the negative side, respectively. The V6 denotes, for example, 12[V]. Hence, the CPL signal (PWM signal) imparted to the signal terminal 106*e* of the external connection section 106 and the signal terminal 5*e* of the external charging connection unit 5 in the state wherein the external connection section 106 is in connection with the external charging connection unit 5 will be a square-wave pulse signal having +V5 (<+V6) and −V6 as the wave height value on the positive side and the wave height value on the negative side, respectively. Then, a positive-polarity portion of the CPL signal (a portion of 0[V] or more) will be supplied to the control processing unit 10 of the battery ECU 9 through the intermediary of the diode 15 and the buffer 17.

in FIG. 4, the CPL signal composed of the PWM signal is output from time t3 and after. However, there are cases where the CPL signal (the PWM signal) is output at time before time t3 following time t2.

Meanwhile, in the vehicle 1, the battery ECU 9 is started (SP6 in FIG. 3) in response to the detection of the connection of the external connection section 106 to the external charging connection unit 5. The startup of the battery ECU 9 causes the constant voltage Vc to be applied to one end of the resistor R5 of the connection state detection signal generating unit 11, and the generation of a connector connection detection signal having a voltage level of V2 is begun.

Then, when the control processing unit 10 of the battery ECU 9 that has started up receives the PWM signal (CPL signal), which indicates the information, such as the permissible charge current of the external power feeding device 100, from the CCID control unit 112 in the state wherein the voltage level of the connector connection detection signal has been changed from V2 to V3 (after time t3 in FIG. 4) by clearing the pressed state of the manual operation button 109 of the connector assembly 101 (by closing the switch S3), the control processing unit 10 controls the switch S2 to turn on (time t4 in FIG. 4), thereby setting a CPL state to a charging-enable state (SP7 in FIG. 3).

The CPL state is a state denoted by a voltage level (wave height value) on the positive side of the CPL signal. In this case, the control processing unit 10 of the battery ECU 9 controls the switch S2 to turn on, thereby causing the voltage of the CPL signal received by the control processing unit 10 through the buffer 17 to be divided by the resistor R3 of the CCID 105 and the parallel resultant resistance of the resistors R6 and R7 of the battery ECU 9. Therefore, the voltage level on the positive side of the CPL signal after time t4 changes to V4, which is lower than V5, as illustrated in FIG. 4. Thus, changing the voltage level of the CPL signal to V4 means to set the CPL state to the charging-enable state. The CPL state in the case where the voltage level of the CPL signal is a voltage level of V5 or higher means a charging-disable state.

At this time, the CCID control unit 112 recognizes, by the signal received through the buffer 113 (the potential signal of the signal terminal 106e of the external connection section 106), that the CPL state has switched to the charging-enable state. In response thereto, the CCID control unit 112 controls the relay switch 111 to be on thereby to start feeding the AC power to the vehicle 1 from the AC power supply to which the plug 102 has been connected (SP8 in FIG. 3).

Further, in the vehicle 1, charging of the battery 3 is started (SP9 in FIG. 3). More specifically, the control processing unit 10 of the battery ECU 9 outputs the charge control signal, which indicates that the battery 3 should be charged, to the charger control unit 8 after setting the CPL state to the charging-enable state as described above. Then, when the charger control unit 8 receives the charge control signal, the charger control unit 8 controls the operation mode of the AC/DC converter 7 to the power feeding operation mode (time t5 in FIG. 5).

Thus, the AC power supplied from the external power feeding device 100 to the AC/DC converter 7 through the external charging connection unit 5 of the vehicle 1 is converted into the DC power by the AC/DC converter 7 and then fed to the battery 3, starting the charging of the battery 3. In other words, as illustrated in FIG. 4, the output state of the AC/DC converter 7 is switched to the ON state (the state in which power is fed to the battery 3) from time t5.

Figure 5:
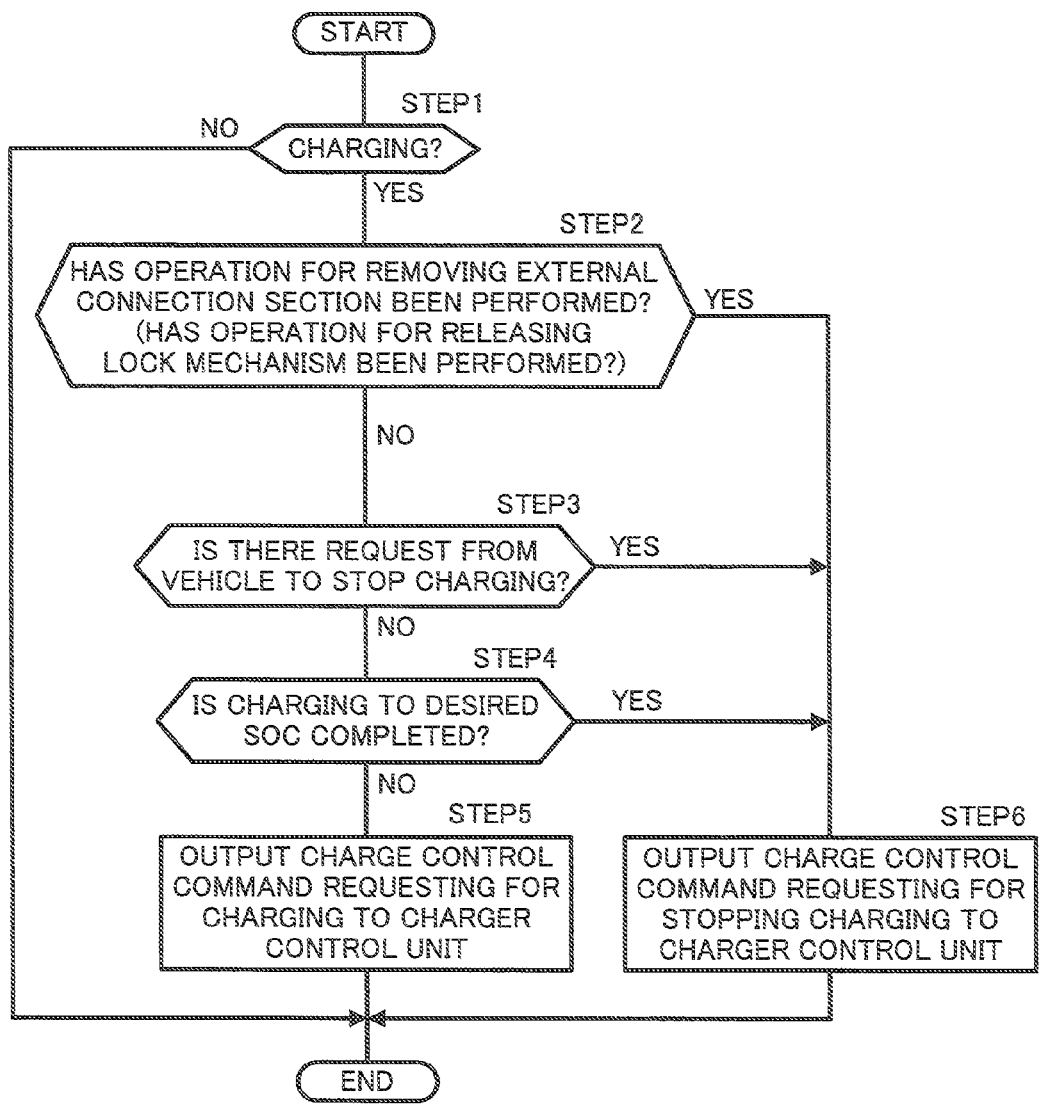
[FIG. 5] It is a flowchart illustrating the control processing by a control processing unit 10 of a battery ECU illustrated in FIG. 1.
Figure 6:
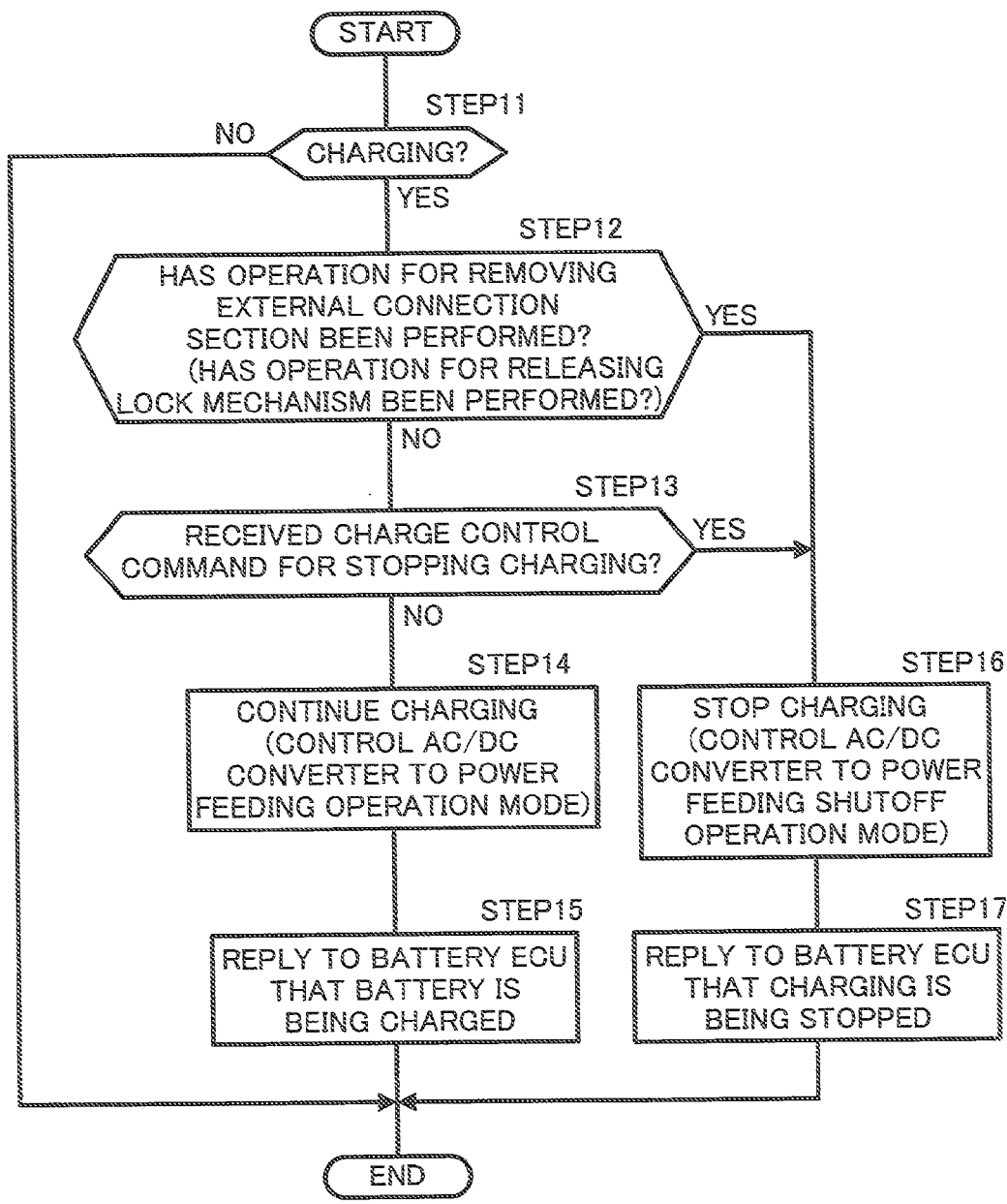
[FIG. 6] It is a flowchart illustrating the control processing by a charger control unit 8 illustrated in FIG. 1.

When the charging of the battery 3 by the external power feeding device 100 is started as described above, the control processing unit 10 of the battery ECU 9 and the charger control unit 8 of the charger 6 sequentially carry out the processing illustrated by the flowcharts of FIG. 5 and FIG. 6, respectively, at predetermined arithmetic processing cycles thereby to control the charging of the battery 3.

More specifically, the control processing unit 10 of the battery ECU 9 checks in STEP1 whether the battery 3 is being charged, and if the battery 3 is not being charged, then the control processing unit 10 terminates the processing illustrated in FIG. 5.

If the battery 3 is being charged, then the control processing unit 10 of the battery ECU 9 determines in STEP2 whether the user has performed the operation for removing the external connection section 106 of the external power feeding device 100 from the external charging connection unit 5 of the vehicle 1 (more specifically, the operation for releasing the lock mechanism 108 of the connector assembly 101).

In this case, to remove the external connection section 106 from the external charging connection unit 5 of the vehicle 1, the user presses the manual operation button 109 of the connector assembly 101 thereby to release the connector assembly 101 locked by the lock mechanism 108 to the vehicle 1. Further, the user detaches the external connection section 106 from the external charging connection unit 5 of the vehicle 1 in the released state. In the case where the manual operation button 109 is pressed, the switch S3 opens in response to the pressing operation, thus causing the voltage level of the connector connection detection signal to change from V3 to V2 (refer to FIG. 4).

Therefore, in STEP2, if the voltage level of the received connector connection detection signal changes from V3 to V2, then the control processing unit 10 of the battery ECU 9 determines that the determination result in STEP2 is affirmative, and if the voltage level of the connector connection detection signal is V3, then the control processing unit 10 determines that the determination result in STEP2 is negative.

If the determination result in STEP2 is negative (if the user is not performing the operation for removing the external connection section 106 from the external charging connection unit 5 of the vehicle 1), then the control processing unit 10 of the battery ECU 9 determines next in STEP3 whether there is a request on the vehicle side for stopping the charging of the battery 3. The request on the vehicle side that the charging should be stopped in this case is a request attributable to, for example, the occurrence of an error, such as an anomaly of the detection value of the charging voltage, the charging current or the temperature of the battery 3.

If the determination result in STEP3 is negative, then the control processing unit 10 of the battery ECU 9 determines next in STEP4 whether the charging of the battery 3 up to a desired SOC, which is the desired value of the remaining capacity of the battery 3, has been completed. In this case, while the battery 3 is being charged, the control processing unit 10 of the battery ECU 9 sequentially calculates the remaining capacity (SOC) of the battery 3 on the basis of the detection values of the charging voltage and the charging current of the battery 3. Then, the control processing unit 10 determines in STEP4 whether the calculated value of the remaining capacity has reached the desired SOC. The desired SOC is, for example, the value of the remaining capacity of the battery 3 in a fully charged state.

If the determination result in STEP4 is negative, then the control processing unit 10 of the battery ECU 9 carries out the processing in STEP5 next, and terminates the processing of the flowchart in FIG. 5 in the current arithmetic processing cycle. In this STEP5, the control processing unit 10 creates a charge control command for requesting the charging (the charge control command indicating that the battery 3 should be charged), and outputs the charge control command to the charger control unit 8 by serial communication.

If the determination result in any one of STEPs 2, 3 and 4 is affirmative, then the control processing unit 10 of the battery ECU 9 carries out the processing in STEP6 next and terminates the processing of the flowchart in FIG. 5 in the current arithmetic processing cycle. In this STEP6, the control processing unit 10 creates a charge control command for stopping the charging (the charge control command indicating that the charging of the battery 3 should be stopped), and outputs the charge control command to the charger control unit 8 by the serial communication.

In parallel to the control processing by the control processing unit 10 of the battery ECU 9, the charger control unit 8 carries out the processing illustrated by the flowchart of FIG. 6 at a predetermined arithmetic processing cycle. In this case, the arithmetic processing cycle of the charger control unit 8 is a shorter arithmetic processing cycle than the arithmetic processing cycle of the control processing unit 10 of the battery ECU 9. Therefore, the processing of the flowchart in FIG. 6 by the charger control unit 8 is carried out at a higher-speed arithmetic processing cycle than the processing of the flowchart in FIG. 5 by the control processing unit 10 of the battery ECU 9.

More specifically, the charger control unit 8 checks in STEP11 whether the battery 3 is being charged, and if the battery 3 is not being charged, then the charger control unit 8 terminates the processing in FIG. 6.

If the battery 3 is being charged, then the charger control unit 8 determines in STEP12 whether the user has performed the operation for removing the external connection section 106 of the external power feeding device 100 from the external charging connection unit 5 of the vehicle 1 (more specifically, the operation for releasing the lock mechanism 108 of the connector assembly 101).

In this case, according to the present embodiment, the aforesaid connector connection detection signal is supplied to the charger control unit 8. Subsequently, in STEP12, the charger control unit 8 carries out the determination in STEP12 on the basis of the connector connection detection signal supplied thereto. The method for the determination is the same as the determination processing in the aforesaid STEP2 carried out by the battery ECU 9.

if the determination result in STEP12 is negative, then the charger control unit 8 determines next in STEP13 whether the charge control command for stopping the charging has been received from the battery ECU 9.

If the determination result in STEP 13 is negative, then the charger control unit 8 continues to control the operation mode of the AC/DC converter 7 to the power feeding operation mode in the following STEP14, thereby continuing the charging of the battery 3.

Subsequently, the charger control unit 8 carries out the processing in STEP15 and terminates the processing of the flowchart in FIG. 6 in the current arithmetic processing cycle. In the STEP15, the charger control unit 8 returns a signal indicating that the battery is being charged to the control processing unit 10 of the battery ECU 9 by the serial communication.

if the determination result in STEP12 or 13 is affirmative, then the charger control unit 8 controls next in STEP16 the operation mode of the AC/DC converter 7 to the power feeding shutoff operation mode so as to stop the charging of the battery 3. In this case, if the determination result in STEP12 is affirmative, then the charging of the battery 3 will be stopped regardless of the determination result in STEP13 (i.e., regardless of the charge control command supplied from the battery ECU 9).

Subsequently, the charger control unit 8 carries out the processing in STEP17 and terminates the processing of the flowchart in FIG. 6 at the current arithmetic processing cycle. In the STEP17, the charger control unit 8 returns a signal, which indicates that the charging is being stopped, to the control processing unit 10 of the battery ECU 9 by the serial communication.

Figure 7:
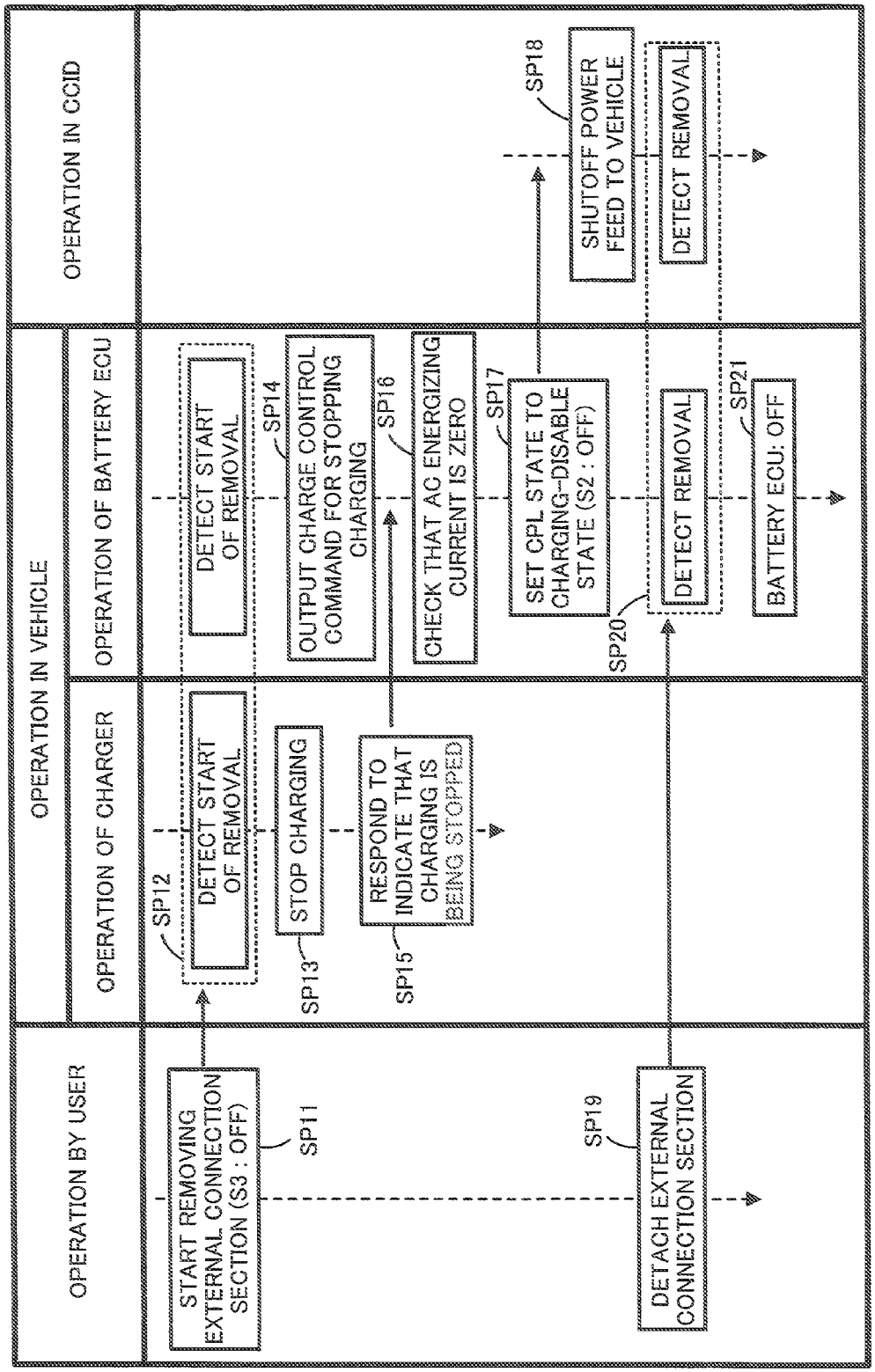
[FIG. 7] It is a diagram illustrating an operation for removing the external power feeding device 100 illustrated in FIG. 1 from the vehicle 1.
Figure 8:
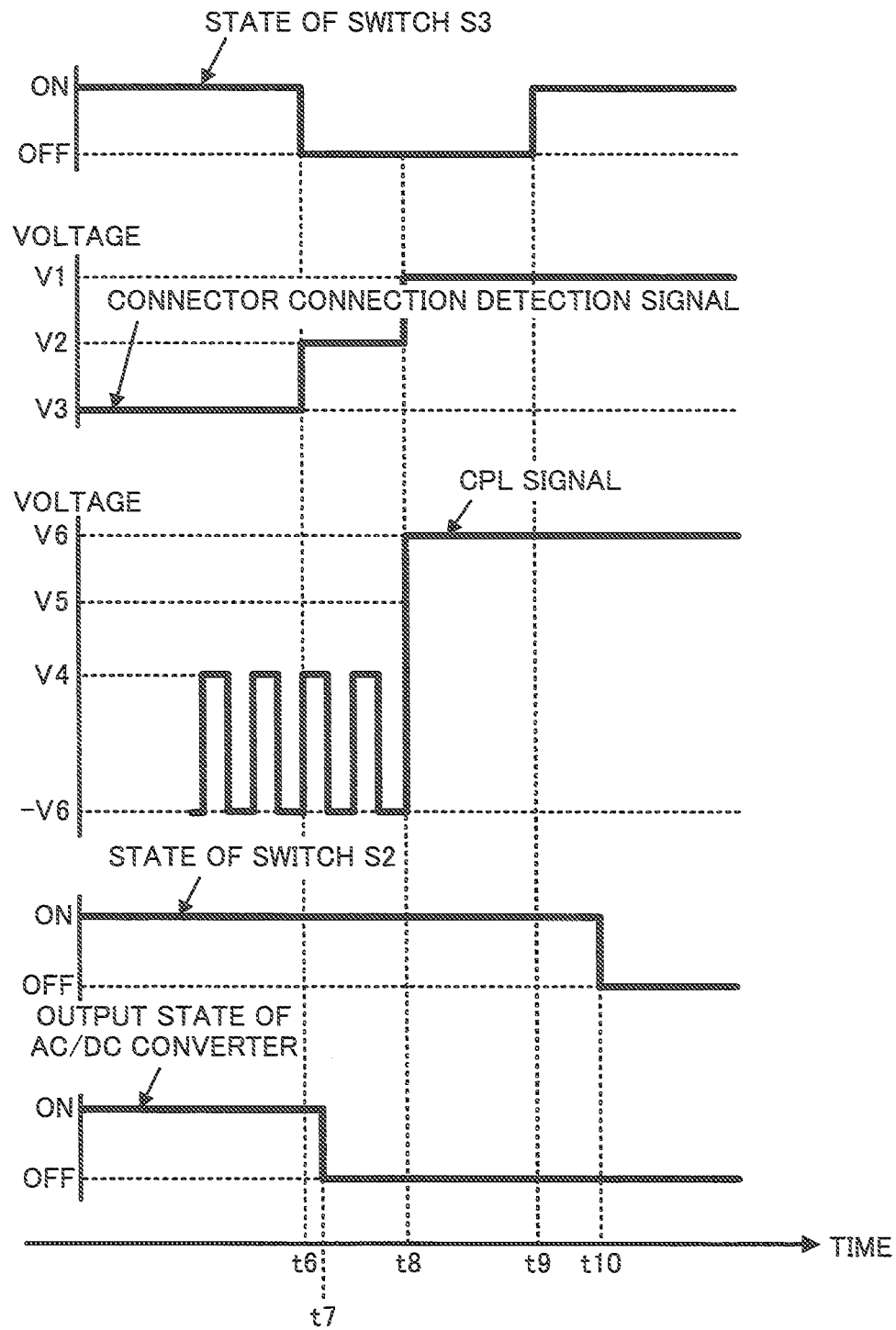
[FIG. 8] It is a timing chart illustrating the operation for removing the external power feeding device 100 illustrated in FIG. 1 from the vehicle 1.

Referring now to FIG. 7 and FIG. 8, a more detailed description will be given of the operation performed by the user to forcibly remove the external connection section 106 of the external power feeding device 100 from the external charging connection unit 5 of the vehicle 1 in a situation in which the charging of the battery 3 is uncompleted (more specifically, in a situation wherein the determination results in STEPs 3 and 4 of the flowchart in FIG. 5 are negative) while the battery 3 is being charged.

First, the user begins the operation for removing the external connection section 106 of the external power feeding device 100 from the external charging connection unit 5 of the vehicle 1 (SP11 in FIG. 7). To be more specific, the user presses the manual operation button 109 of the connector assembly 101 to release the connector assembly 101 locked onto the vehicle 1 by the lock mechanism 108. In this case, in response to the pressing operation of the manual operation button 109, the switch S3 is opened (turned off). The timing at which the switch S3 is opened (turned off) by pressing the manual operation button 109 is time t6 in FIG. 8.

In FIG. 8, time t8 is the time at which the external connection section 106 was detached from the external charging connection unit 5 of the vehicle 1, and time t9 is the time at which the removal of the external connection section 106 was completed and the user cleared the pressed state of the manual operation button 109 of the connector assembly 101 (the time at which the switch S3 is closed).

When the switch S3 is opened at time t6 mentioned above, the voltage level of the connector connection detection signal supplied to both the control processing unit 10 of the battery ECU 9 and the charger control unit 8 of the charger 6 changes from V3 to V2. This causes both the control processing unit 10 of the battery ECU 9 and the charger control unit 8 of the charger 6 to detect that the user has begun the operation for removing the external connection section 106 (SP12 in FIG. 7).

Upon the detection of the start of the operation for removing the external connection section 106, the charger control unit 8 controls the operation mode of the AC/DC converter 7 to the power feeding shutoff operation mode thereby to stop the charging of the battery 3 (SP13 of FIG. 7). This control processing by the charger control unit 8 in SP13 is the processing in STEP 16 in the case where the determination result in STEP 12 of FIG. 6 is affirmative. Thus, the output (power feed) from the AC/DC converter 7 of the charger 6 to the battery 3 is cut off (turned off) from time t7 in FIG. 8 (the time immediately after time t6). Hence, basically, the power feeding to the battery 3 is shut off in the AC/DC converter 7 at time before the time at which the removal of the external connection section 106 from the external charging connection unit 5 of the vehicle 1 is completed (time t8 in FIG. 8).

Meanwhile, the control processing unit 10 of the battery ECU 9 that has detected the start of the operation for removing the external connection section 106 creates the charge control command for stopping the charging upon the detection and outputs the charge control command to the charger control unit 8 (SP14 in FIG. 7).

The charge control command is serial communication data, so that certain time is required for completing the transmission and reception of the data. Further, the control processing unit 10 of the battery ECU 9 carries out, for example, the processing for calculating the remaining capacity of the battery 3 while the battery 3 is being charged, so that the time for each arithmetic processing cycle will be inevitably longer than the arithmetic processing cycle of the charger control unit 8.

Therefore, even when the control processing unit 10 of the battery ECU 9 creates and transmits the charge control command for stopping the charging upon the detection of the start of the operation for removing the external connection section 106, certain time is required for the charger control unit 8 to finally complete receiving the charge control command and for the charge command control to be accepted by charger control unit 8.

Hence, the control processing that the charger control unit 8 carries out to stop the charging of the battery 3 in SP13 upon the detection of the start of the operation for removing the external connection section 106 will be carried out before the charger control unit 8 eventually accepts the charge control command for stopping the charging from the control processing unit 10 of the battery ECU 9.

Further, when the charger control unit 8 receives the charge control command for stopping the charging transmitted from the control processing unit 10 of the battery ECU 9, the charger control unit 8 transmits a response, which indicates that the charging of the battery 3 is being stopped, to the control processing unit 10 of the battery ECU 9 (SP15 in FIG. 7). This processing corresponds to the processing in STEP17 of the flowchart in FIG. 6.

The control processing unit 10 of the battery ECU 9 also checks that the AC energizing current (the AC current flowing into the AC/DC converter 7) has a predetermined threshold value or less (e.g., zero) by the response signal from the charger control unit 8 (SP16 in FIG. 7). Further the control processing unit 10 of the battery ECU 9 controls the switch S2 to the off state (SP17 in FIG. 7) to set the CPL state to the charging-disable state (to set the voltage level of the CPL signal to a voltage level of V5 or higher).

In the CCID 105 of the external power feeding device 100, the CCID control unit 112 recognizes the CPL state by the voltage level of the signal received through the buffer 113. In the case where it is recognized that the CPL state is the charging-disable state, the CCID control unit 112 controls the relay switch 111 to the off state so as to shut off the power feeding (the supply of the AC power) to the vehicle 1.

The timing chart of FIG. 8 is based on an assumption that the user removes the external connection section 106 relatively quickly and the external connection section 106 is detached from the external charging connection unit 5 of the vehicle 1 at time t8, which is before time t10 at which the control processing unit 10 of the battery ECU 9 controls the switch S2 to the off state, so as to set the CPL state to the charging-disable state. This causes the voltage level of the CPL signal imparted to the signal terminal 106e of the external connection section 106 from the CCID control unit 112 to change to the voltage level of V6 from time t8. Thus, the CCID control unit 112 shuts off the power feeding to the vehicle 1 immediately after time t8.

When the external connection section 106 is detached from the external charging connection unit 5 of the vehicle 1 by the operation for removing the external connection section 106 by the user (SP19 in FIG. 7), this is detected by the control processing unit 10 of the battery ECU 9 and the CUD control unit 112 of the CCID 105 (SP20 in FIG. 7).

In this case, when external connection section 106 is detached from the external charging connection unit 5 of the vehicle 1, the voltage level of the connector connection detection signal input to the control processing unit 10 of the battery ECU 9 changes from V2 to V1 and there will be no input from the diode 15, causing the CPL signal supplied to the control processing unit 10 to become a zero-level signal. Thus, the control processing unit 10 detects the removal of the external connection section 106 from the external charging connection unit 5. Upon the detection, the supply of power to the battery ECU 9 is cut off, placing the battery ECU 9 into the off state (sleep state) (SP21 in FIG. 7).

When the external connection section 106 is detached from the external charging connection unit 5 of the vehicle 1, the voltage level on the positive side of the signal supplied to the CCID control unit 112 through the buffer 113 becomes V6. This enables the CCID control unit 112 to detect the removal of the external connection section 106 from the external charging connection unit 5.

The above has described in detail the operation performed when the external connection section 106 of the external power feeding device 100 is forcibly removed by the user from the external charging connection unit 5 of the vehicle 1 in the situation wherein the charging of the battery 3 is uncompleted while the battery 3 is being charged.

Supplementarily, regarding the operation in the case where the external connection section 106 is removed after the charging of the battery 3 is completed (more specifically, in the case where the determination result in STEP4 becomes affirmative, in the situation in which the determination results in STEPs 2 and 3 in FIG. 5 remain negative), the processing from SP15 and after (except SP20) in FIG. 7 will be carried out after the processing in STEP6 of FIG. 5 is carried out.

In the present embodiment described above, in the case where the operation for removing the external connection section 106 from the external charging connection unit 5 of the vehicle 1 is performed by the user in the middle of charging the battery 3 of the vehicle 1 by the external power feeding device 100, the charger control unit 8 promptly cuts off the supply of the charging power to the battery 3 from the AC/DC converter 7 immediately following the start of the removing operation, without waiting for the charge control command received from the control processing unit 10 of the battery ECU 9. With this arrangement, the power feeding to the battery 3 can be cut of (i.e., the AC current flowing to the external charging connection unit 5 of the vehicle 1 from the external connection section 106 can be cut off) with high reliability before the external connection section 106 is detached from the external charging connection unit 5 of the vehicle 1 even in the case where the operation for removing the external connection section 106 is performed by the user relatively quickly.

As a result, it is possible to effectively prevent the occurrence of arcs at the places of contact between the AC terminals 106a and 106b of the external connection section 106 and the AC terminals 5a and 5b of the external charging connection unit 5 when detaching the external connection section 106 in the middle of charging the battery 3.

In the embodiments described above, the lock mechanism 108 for locking the connector assembly 101 of the external power feeding device 100 to the vehicle 1 is provided on the connector assembly 101. Alternatively, however, the lock mechanism may be provided on the vehicle 1.

DESCRIPTION OF REFERENCE NUMERALS

1 . . . vehicle; 3 . . . battery (electric storage device); 5 . . . external charging connection unit; 7 . . . AC/DC converter (power converter); 8 . . . charger control unit (power converter control unit); 10 . . . control processing unit (electric storage device management control unit); 11 . . . connection state detection signal generating unit; 100 . . . external power feeding device; 108 . . . lock mechanism; R4 . . . first resistor on vehicle; R5 . . . second resistor on vehicle; R1, R2, S3 . . . constituent elements of external resistance circuit

The invention claimed is:

1. A control apparatus for a vehicle having an electric storage device, an external charging connection unit to which an external power feeding device, which supplies electric power for charging the electric storage device from outside a vehicle, can be detachably connected and the external power feeding device is locked thereto through the intermediary of a lock mechanism in a state in which the external power feeding device is in connection thereto, and a power converter which is electrically connected to the external charging connection unit and the electric storage device and which is capable of controlling an operation mode to a power feeding operation mode, which is an operation mode for converting power supplied from the external power feeding device to the external charging connection unit into power to be charged into the electric storage device and then feeding the converted power to the electric storage device, and a power feeding shutoff operation mode, which is an operation mode for cutting off the power feeding, the control apparatus for vehicle comprising:

a connection state detection signal generating unit which generates at least a detection signal indicating a case where the external power feeding device has been connected to the external charging connection unit and a detection signal indicating a case where an operating for releasing the lock mechanism to detach the external power feeding device from the external charging connection unit has been performed;

an electric storage device management control unit which receives the detection signals from the connection state detection signal generating unit and generates and outputs a charge control command instructing whether or not to charge the electric storage device while monitoring a charge/discharge state of the electric storage device; and a power converter control unit which receives the detection signals from the connection state detection signal generating unit and also receives the charge control command from the electric storage device management control unit to control the operation mode of the power converter according to the detection signals or the charge control command, wherein the power converter control unit controls the power converter to the power feeding operation mode in the case where the charge control command instructing that the electric storage device should be charged is input from the electric storage device management control unit and also controls the power converter to the power feeding shutoff operation mode independently of the charge control command in the case where the detection signal which indicates that the operation for releasing the lock mechanism has been performed is input from the connection state detection signal generating unit, wherein the power converter control unit is a control unit that controls the operation mode of the power converter at an arithmetic processing cycle that is faster than that of the electric storage device management control unit.

2. A control apparatus for a vehicle having an electric storage device, an external charging connection unit to which an external power feeding device, which supplies electric power for charging the electric storage device from outside a vehicle, can be detachably connected and the external power feeding device is locked thereto through the intermediary of a lock mechanism in a state in which the external power feeding device is in connection thereto, and a power converter which is electrically connected to the external charging connection unit and the electric storage device and which is capable of controlling an operation mode to a power feeding operation mode, which is an operation mode for converting power supplied from the external power feeding device to the external charging connection unit into power to be charged into the electric storage device and then feeding the converted power to the electric storage device, and a power feeding shutoff operation mode, which is an operation mode for cutting off the power feeding, the control apparatus for vehicle comprising:

a connection state detection signal generating unit which generates at least a detection signal indicating a case where the external power feeding device has been connected to the external charging connection unit and a detection signal indicating a case where an operating for releasing the lock mechanism to detach the external power feeding device from the external charging connection unit has been performed;

an electric storage device management control unit which receives the detection signals from the connection state detection signal generating unit and generates and outputs a charge control command instructing whether or not to charge the electric storage device while monitoring a charge/discharge state of the electric storage device; and a power converter control unit which receives the detection signals from the connection state detection signal generating unit and also receives the charge control command from the electric storage device management control unit to control the operation mode of the power converter according to the detection signals or the charge control command, wherein the power converter control unit controls the power converter to the power feeding operation mode in the case where the charge control command instructing that the electric storage device should be charged is input from the electric storage device management control unit and also controls the power converter to the power feeding shutoff operation mode independently of the charge control command in the case where the detection signal which indicates that the operation for releasing the lock mechanism has been performed is input from the connection state detection signal generating unit, wherein the connection state detection signal generating unit comprises: a first resistor on a vehicle, which is connected between a pair of terminals provided on the external charging connection unit; a second resistor on the vehicle, which is connected in series with the first resistor on the vehicle; and an external resistance circuit provided in the external power feeding device such that the external resistance circuit is connected in parallel to the first resistor on the vehicle between the pair of terminals in a state in which the external power feeding device is in connection with the external charging connection unit, wherein the external resistance circuit is configured such that the resistance value thereof differs between a case where an operation for releasing the lock mechanism has been performed and a case where the operation for releasing the lock mechanism has not been performed, and the external resistance circuit outputs a potential signal, which is generated between the first resistor on the vehicle and the second resistor on the vehicle, as the detection signal by applying a DC voltage to a circuit, which is comprised of the first resistor on the vehicle, the second resistor on the vehicle and the external resistance circuit, in a state in which the external power feeding device is in connection with the external charging connection unit.

* * * * *